United States Patent [19]

Hoda et al.

[11] Patent Number: 4,480,060

[45] Date of Patent: Oct. 30, 1984

[54] MICA-RESIN COMPOSITE MATERIAL

[75] Inventors: Syed N. Hoda, Horseheads; Anthony R. Olszewski, Bath, both of N.Y.

[73] Assignee: Corning Glass Works, Corning, N.Y.

[21] Appl. No.: 461,572

[22] Filed: Jan. 27, 1983

[51] Int. Cl.³ .................................................. C08K 3/34
[52] U.S. Cl. ...................................... 523/466; 524/449
[58] Field of Search .......................... 523/466; 524/449

[56] References Cited

U.S. PATENT DOCUMENTS 2,614,055 10/1952 de Senarclens ..................... 524/499
4,239,519 12/1980 Beall et al. .......................... 264/212

Primary Examiner—Lewis T. Jacobs
Attorney, Agent, or Firm—C. S. Janes, Jr.

[57] ABSTRACT

A composite material is disclosed which is composed essentially of an ion-exchanged, synthetic, crystalline mica and an organic resin, the mica constituting at least about 50% by weight of the composite, and the mechanical properties of the composite being superior to those of the mica pressed alone.

19 Claims, No Drawings

MICA-RESIN COMPOSITE MATERIAL

BACKGROUND OF THE INVENTION

This invention is concerned with a composite material composed essentially of an ion-exchanged, synthetic, crystalline mica and an organic resin. It is further concerned with the production of such composite in the form of a sheet or board that is relatively strong, is fire-retardant, and can be punched and/or drilled.

U.S. Pat. No. 4,239,519 (Beall et al.) describes the production of gels from a synthetic, lithium and/or sodium, water-swelling mica. It further describes producing papers and films from such gels. The method described for gel production comprises three basic steps:

(1) a fully or predominantly crystalline body is formed (commonly a glass-ceramic body) containing crystals consisting essentially of a lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluoropolylithionite, polylithionite, phlogopite, and fluorophlogopite;

(2) the body is contacted with a polar liquid, normally water, to cause swelling and disintegration of the body accompanied with the formation of a gel; and (3) the solid:liquid ratio of the gel is adjusted to a desired level depending upon the product to be prepared therefrom.

Gels formed in this manner are broken and flocculated by contact with a source of a large exchangeable cation, usually potassium ($K^+$). The large cation replaces lithium and/or sodium ions on the silicate surfaces.

Efforts were made to form board by flocculating the mica gel by ion exchange, vacuum draining the floc material, and pressing the filter cake. The pressed material was observed to be rather weak and porous. However, certain properties, such as electrical properties, were of interest. Therefore, it became desirable to somehow modify the cake to impart strength and eliminate porosity without unduly diminishing other properties.

PURPOSE OF THE INVENTION

A basic purpose is to provide a new and improved method of converting ion-exchanged, synthetic mica floc to sheet or board form.

A further purpose is to provide a new and unique composite material and products formed therefrom.

Another purpose is to provide a composite material embodying an ion-exchanged floc from a synthetic mica gel.

A further purpose is to provide such composite wherein the composite strength exceeds that of either component material independently.

SUMMARY OF THE INVENTION

The invention is a composite material composed of ion-exchanged, synthetic mica crystals and an organic resin, the mica being in platelet form having a high aspect ratio, being a lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite, and being ion-exchanged with the lithium and/or sodium ions in the mica platelets being replaced by larger cations, the mica constituting at least 50% by weight of the composite and the mechanical strength of the composite exceeding that of either component individually.

The composite is produced from a floc composed essentially of ion-exchanged, synthetic mica crystals. This involves converting the floc to particulate form, mixing the particulate floc with resin in particulate form, dispersing the mixture in a solvent, drying the dispersion, and pressing the dried material to desired form at an elevated temperature and pressure.

In specific embodiments, the selected mica is a lithium fluorhectorite, the resin is an epoxy, and the ion exchange is accomplished by potassium or an organic cation. The floc may be converted to particulate form by spray drying, and the mica-resin mix may be dispersed in tetrahydrofuran.

GENERAL DESCRIPTION OF THE INVENTION

The invention evolved from attempts to produce board or sheet products utilizing the synthetic micas disclosed in U.S. Pat. No. 4,239,519. That patent teaches the production of synthetic, lithium and/or sodium, mica bodies that swell and disintegrate in a polar liquid. The bodies are fully, or predominantly, crystalline, and disintegrate as high aspect ratio platelets that disperse in the liquid to form a gel. The mica crystal phase is selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite.

The patent further teaches that, when the gel is contacted with a source of a large exchangeable cation, the lithium and/or sodium ions in the mica crystals are displaced (exchanged) with the result that the gel is flocculated. Numerous large ions are disclosed, but potassium is customarily employed. More recent studies have shown distinct advantages from using organic cations on occasion. In order to avoid repetition, the teaching of the reference patent is incorporated herein in total. Further, reference is made to concurrently, filed applications Ser. No. 461,571, filed Jan. 27, 1983, now U.S. Pat. No. 4,44,237 issued June 12, 1984, of S. N. Hoda and A. R. Olszewski and entitled "Organic-Inorganic Composite Containing Synthetic Mica", and Ser. No. 461,672, filed Jan. 27, 1983, now U.S. Pat. No. 4,455,382, issued June 19, 1984, in the name of S. H. Wu and entitled "Organic-Inorganic Composites of Neutralized Polyelectrolyte Complexes". These applications describe in detail the use of organic cations for ion exchange.

The floc produced from a synthetic mica gel, as disclosed in the Beall et al. patent, was washed and separated from liquid as by vacuum filtration. The damp mass was pressed to form boards. These boards were rather weak and porous. Efforts to reinforce these with fibers were unsuccessful.

Studies were then initiated to determine whether introduction of a resin would toughen the mica board and render it less porous. Impregnation of the board with epoxy resin was tried. While electrical properties were desirable, there was no substantial change in strength.

The next step was to reduce the floc to particulate form, intermingle the particles with resin particles, and redisperse the mixture. The mix, containing minor amounts of coupling and curing agents, was then dried either in air or in a low temperature oven.

The resulting dry powder was transferred to a mold and subjected to compression molding. Studies made on a series of pressed boards produced in this manner revealed at least two surprising results. First, workable composite mixtures could be produced containing up to 90 plus percent mica material. Second, unlike most fillers which tend to reduce strength, the synthetic mica-resin molded bodies tended to exhibit strength values that exceeded values for either material individually. Further, the pressed composite had a smooth surface and tended to have an opaque white appearance.

The ion-exchanged mica floc may be converted to particulate form by different procedures. The simplest is drying and ball milling. However, ball milling, or similar mechanical disintegration, inevitably damages the mica surface and creates structural defects in the mica platelets.

To avoid such damage, spray drying was employed. This procedure was facilitated by draining the floc and redispersing it in a measured amount of water to give a slurry of predetermined solids content. This was passed through a spray drying apparatus and produced dry, clay-like particles.

A quantity of the spray-dried mica was mixed with a desired ratio of epoxy resin (both in particulate form) in conjunction with a quantity of curing agent and coupling agent. This dry mixture was then blended with a suitable solvent to provide a well dispersed mixture.

This mixture was dried in air. Alternatively, it could be dried in a reduced pressure oven operating, for example, at 150° C. and 26 psi pressure. The dried powder was then placed in a mold, lined to prevent sticking, and subjected to compression molding. Typical mold conditions were 7000 psi at 150° C. for one hour.

Numerous different resin materials have been employed in producing compression molded boards. These include melamine, polyimide, phenolic and epoxy. The latter (epoxy) appeared to give the best properties. Hence, that material has been studied in greater depth.

SPECIFIC DESCRIPTION OF THE INVENTION

A quantity of gel was produced in accordance with the procedure disclosed in U.S. Pat. No. 4,239,519 (Beall et al.) Initially, a glass-ceramic was melted as a glass and crystallized to an essentially completely crystalline lithium fluorhectorite. The material had the following composition as calculated in weight percent on an oxide basis: 64.5% $SiO_2$, 10.8% MgO, 8.0% $Li_2O$, and 16.7% $MgF_2$.

The glass-ceramic was placed in water where it underwent swelling and disintegration into mica crystals in platelet form. Dispersion of the crystals in the water formed a gel, the solids content of which was adjusted by water addition to approximately 5% solids by weight.

The gel thus produced was mixed with a potassium ion donor, a potassium chloride solution, to effect an exchange between potassium ions and lithium ions in the mica crystals. This exchange was necessary to break the gel and release the crystalline mica as floc.

The floc formed by ion exchanging the gel was separated from ion exchange salts by rinsing, and then was drained by vacuum filtration. The filter cake was mixed with a quantity of water such as to produce a suspension containing approximately 5% solids. This was then blended to redisperse the floc and produce a flowable slurry.

The slurry was pumped to a spray gun operating under 85 psi air pressure with a dryer operating at about 150° C. The spray dried powder was collected in glass jars at a rate of about one pound per hour. The powder collected was quite fine with ten microns being an average particle size. That is, about 50% of the particles were equal to or greater than ten microns and 50% were smaller. Transmission electra micrographs, however, indicate a significant degree of particle association with individual particles being one to two microns in diameter.

Chemical analyses of the ion-exchanged floc showed an average composition as follows:

| | |
|---|---|
| $SiO_2$ | 55.5 |
| MgO | 22.8 |
| $K_2O$ | 6.7 |
| $Li_2O$ | 2.6 |
| CaO | 0.4 |
| Cl | 0.3 |
| F | 8.5 |
| 0 = F | 3.3 |

A predetermined amount of the spray-dried floc was provided with a 2% addition of a silane coupling agent, either gamma-glycidoxypropyl trimethoxy silane (Z6040) or a 3,2-(amino-ethylamino)propyltrimethoxy silane (Z6020). An appropriate addition of epoxy resin, in particulate form, was made, followed by 23 parts of a curing agent, N-amino-ethylpiperazine, per 100 parts resin. A typical mixture consisted of 9.01 grams of spray-dried floc (potassium ion-exchanged lithium fluorhectorite), 1.19 grams of a DGEBA epoxy resin available from Shell Chemical Co. under the mark EPON 828, 0.18 grams of the silane coupling agent and 0.47 grams of the epoxy curing agent. The contents of the several ingredients were varied to provide a series of different resin-floc proportions. Properties were measured and/or observed on these several mixtures as reported subsequently in TABLE 1.

In each case, the dry mixture was placed in a blender and a solvent (tetrahydrofuran or acetone) added to provide approximately 100 ml. volume. The combination was mixed manually, and then blended for about 30 seconds to provide a well dispersed mix. This mixture was air-dried or, alternatively, dried in a vacuum oven operating at 115° C. and 26 psig. The dried mix, in powder form, was transferred to a mold with inert lining for pressing. The material was pressed into a bar ($4\frac{1}{2}"\times\frac{5}{8}"\times\frac{1}{8}"$) or a $2\frac{1}{2}"$ disc depending on subsequent test needs. The several mixes were compression molded, as indicated, at a temperature of 150° C., a pressure of 7,000 psi, and for a period of one hour.

The epoxy resin content was varied from 5 to 50% on a weight basis. Properties for the several molded bodies are shown in TABLE I.

TABLE I

| Sample No. | Epoxy Level | Cure Time Min. - °C. | Flex Strength psi |
|---|---|---|---|
| Coupling Agent Z6020 | | | |

TABLE I-continued

| Sample No. | Epoxy Level | Cure Time Min. - Temp. °C. | Flex Strength psi |
|---|---|---|---|
| 1 | 5 | 10 - 150° | 8,400 |
| 2 | 10 | 60 - 150° | 13,300 |
| 3 | 15 | 60 - 150° | 16,110 |
| 4 | 15 | 30 - 100° + overnight - 50° | 21,000 |
| 5 | 17 | 30 - 150° | 7,300 |
| 6 | 20 | overnight - 75° | 28,900 |
| 7 | 25 | 60 - 150° | 13,600 |
| 8 | 50 | 60 - 120° | 19,400 |
| Coupling Agent Z6040 | | | |
| 9 | 12 | 60 - 100° | 24,000 |
| 10 | 20 | overnight - 75° | 23,900 |

Flexural strength was measured on bar samples on an instrument wherein the bar was rested on spaced knife edges and subjected to loading at a central knife edge across the bar. Strength was then calculated using the formula.

$$S = \frac{3LI}{2bh^2} \times 14.223$$

where
S = strength in psi
L = breaking load in grams
I = span between supports in cm.
b = sample width in cms.
h = sample thickness in cms.

It will be noted that all samples containing epoxy additions showed greater flexural strength than a mica bar prepared without epoxy addition. However, the greatest improvement appears to be associated with longer curing times. It may be noted that literature reports an MOR of about 18,000 psi for unfilled epoxy. Twenty percent (20%) additions of various inorganics are reported as reducing the MOR to values ranging from ten to seventeen thousand. Specifically, a 20% addition of natural mica is reported to reduce the MOR to about 12,000 psi.

The general applicability of organic resins in composite materials and bodies of the invention is illustrated in the examples that follow:

EXAMPLE 11

A quantity of spray dried floc was prepared as described above. Fifteen (15) grams of this floc were mixed with 1.4 grams of a phenolic modified terpene resin available from Hercules Inc. under the trade designation Piccofyn A135. 0.3 gram of Z6020 silane coupling agent was added. About 50 ml. of toluene was added and the batch mixed vigorously in a Waring blender at high speed for thirty seconds. The mix was then poured into a mortar and ground until dry. The dry material was placed in a bar mold and molded under a pressure of 8000 psi and temperature of 150° C. for 30 minutes.

The bar thus produced was then subjected to a loading test on spaced knife edges. A MOR of 7500 psi was determined. However, the present bar was observed to be much tougher and less porous than prior pressed bars.

EXAMPLE 12

A second 15 gram sample of spray floc was mixed with 1.52 grams of a polyimide resin available from DuPont, Inc. under the code designation NR150. About 50 ml of tetrahydrofuran (THF) was added, and the mix blended for 30 seconds in a Waring blender at high speed. The blended mix was poured in a mortar and ground until dry.

The material was placed in a vacuum oven operating at 115° C. and evacuated by an aspirator. After eight (8) hours, the material was further heated at the same temperature for 16 hours at atmospheric pressure. The material was then placed in a bar mold and molded at 8000 psi and 250° C. for one hour.

The bar was observed to have an MOR of 9800 psi. As in Example 11, the bar was much tougher and less porous than prior pressed bars.

EXAMPLE 13

Another 15 gram sample of spray dried floc was mixed with 1.5 grams of a phenolic resin available from Hooker Chemical under the trade designation Durez 12763. 0.2 grams of Z6020 silane was added as coupling agent. The mix was placed in a Waring blender with 50 ml acetone and blended at high speed for 30 seconds. The blended mix was poured into a mortar and ground until dry. The dry material was placed in a bar mold and molded at a temperature of 165° C. and pressure of 8000 psi for thirty minutes.

The molded bar was observed to have an MOR of 9500 psi. Again the bar was observed to be much improved over prior pressed bars with respect to toughness and porosity.

RELATED LITERATURE

U.S. Pat. No. 4,239,519 describes the synthetic mica materials that are useful in the present invention, and their production. It further describes forming a gel from such materials, flocculating the gel and processing the floc to form papers, films, boards, fibers and the like.

Bureau of Mines Bulletin No. 647 (1969) presents results of numerous studies on micas. In particular, it describes a sintering process whereby a synthetic mica may be produced.

An article, entitled "Epoxy-Mica Paper Laminate Reinforcement", and authored by E. C. Dingman appears in Society of Plastic Engineers Journal, September, 1961, pp. 981-983. It discusses papers made with reconstituted and integrated micas, and the laminations of such papers with epoxy resins.

It is believed these references, taken with literature made of record therein, represent the most closely related literature.

We claim:
1. The method of forming a composite body composed of ion-exchanged, synthetic mica crystals and an organic resin which comprises the steps of,
 providing in flocculated form an ion-exchanged, synthetic, lithium and/or sodium, crystalline mica, the mica being selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithioinite, polylithionite, phlogopite, and fluorphlogopite,
 converting the floc to particulate form,
 mixing the particulate floc with an organic resin in particulate form and in such amount that the processed composite has a greater mechanical strength than similarly processed floc alone, and contains at least 50% floc dispersing the mixture in a solvent, drying the dispersed mixture, and pressing the dried mixture to desired form at an elevated temperature and pressure.

2. A method in accordance with claim 1 wherein the selected water-swelling mica is a lithium fluorhectorite.

3. A method in accordance with claim 1 wherein the lithium and/or sodium, water-swelling mica is ion-exchanged with an organic cation.

4. A method in accordance with claim 1 wherein the lithium and/or sodium, water-swelling mica is ion-exchanged with potassium.

5. A method in accordance with claim 1 wherein the organic resin is an epoxy.

6. A method in accordance with claim 1 wherein a coupling agent is added in amount up to 2% of the floc plus resin.

7. A method in accordance with claim 6 wherein the coupling agent is a silane compound.

8. A method in accordance with claim 1 wherein the floc is redispersed and spray dried to convert it to particulate form.

9. A method in accordance with claim 1 wherein the mixture of spray dried mica and resin is dispersed, dried and then compression molded.

10. The method of forming a composite body composed of ion-exchanged, synthetic mica crystals and an organic resin which comprises the steps of forming a fully or predominantly crystalline body containing crystals consisting essentially of a synthetic, lithium and/or sodium, water-swelling mica selected from the group of fluorhectorite, hydroxyl hectorite, boron fluorphlogopite, hydroxyl boron phlogopite, and solid solutions among those and between those and other structurally-compatible species selected from the group of talc, fluortalc, fluorpolylithionite, polylithionite, phlogopite, and fluorphlogopite, contacting the body with a polar liquid to cause the body to swell and disintegrate into platelets having a high aspect ratio which disperse in the liquid and form a gel, mixing the gel with a donor of a larger cation whereby the larger cation exchanges with the lithium and/or sodium ions of the mica to form ion-exchanged particles which flocculate, converting the floc thus formed to a particulate form, mixing the particulate floc with an organic resin in particulate form and in such amount that the processed composite has a greater mechanical strength than similarly processed floc alone while the floc constitutes at least 50% of the composite, adding a coupling agent, dispersing the mixture in a solvent, drying the dispersed mixture to a powder form, pressing the powdered mixture to desired form at an elevated temperature and pressure.

11. A method in accordance with claim 10 wherein the crystalline body is a synthetic lithium fluorhectorite.

12. A method in accordance with claim 10 wherein the polar liquid is water and the solids dispersed therein amount to 5-10% of the gel formed.

13. A method in accordance with claim 10 wherein the larger ion exchanging for lithium and/or sodium is potassium.

14. A method in accordance with claim 10 wherein the organic resin mixed with the floc is an epoxy.

15. A method in accordance with claim 14 wherein the floc in the mixture constitutes at least 50% of the solids.

16. A method in accordance with claim 10 wherein the coupling agent is added in an amount up to 2% of the solids content.

17. A method in accordance with claim 16 wherein the coupling agent is a silane compound.

18. A method in accordance with claim 10 wherein the mixture of mica and resin particles is dispersed, dried and then compression molded.

19. A method in accordance with claim 10 wherein the floc is redispersed and spray dried to convert it to particulate form.

* * * * *